United States Patent
Palfrey et al.

(10) Patent No.: US 11,120,341 B1
(45) Date of Patent: Sep. 14, 2021

(54) DETERMINING THE VALUE OF FACTS IN A KNOWLEDGE BASE AND RELATED TECHNIQUES

(71) Applicant: Amazon Technologies, Inc., Seattle, WA (US)

(72) Inventors: David Spike Palfrey, Cambridge (GB); Sina Samangooei, Cambridge (GB); Mihai Valentin Tablan, Cambridge (GB); Maxime Peyrard, Monistrol-sur-Loire (FR)

(73) Assignee: Amazon Technologies, Inc., Seattle, WA (US)

( * ) Notice: Subject to any disclaimer, the term of this patent is extended or adjusted under 35 U.S.C. 154(b) by 1071 days.

(21) Appl. No.: 14/974,634

(22) Filed: Dec. 18, 2015

(51) Int. Cl.
 *G06N 5/02* (2006.01)
 *G06N 5/04* (2006.01)

(52) U.S. Cl.
 CPC .............. *G06N 5/022* (2013.01); *G06N 5/04* (2013.01)

(58) Field of Classification Search
 CPC .......................... G06N 5/022; G06F 16/2455
 See application file for complete search history.

(56) References Cited

U.S. PATENT DOCUMENTS

| | | | |
|---|---|---|---|
| 7,013,308 B1 | 3/2006 | Tunstall-Pedoe | |
| 7,707,160 B2 | 4/2010 | Tunstall-Pedoe | |
| 8,219,599 B2 | 7/2012 | Tunstall-Pedoe | |
| 8,468,122 B2 | 6/2013 | Tunstall-Pedoe | |
| 8,666,928 B2 | 3/2014 | Tunstall-Pedoe | |
| 8,719,318 B2 | 5/2014 | Tunstall-Pedoe | |
| 8,838,659 B2 | 9/2014 | Tunstall-Pedoe | |
| 8,935,192 B1* | 1/2015 | Ventilla | G06N 5/04 706/45 |
| 9,098,492 B2 | 8/2015 | Tunstall-Pedoe | |
| 9,110,882 B2 | 8/2015 | Overell et al. | |
| 9,436,681 B1 | 9/2016 | Tunstall-Pedoe et al. | |
| 9,466,294 B1 | 10/2016 | Tunstall-Pedoe et al. | |
| 9,519,681 B2 | 12/2016 | Tunstall-Pedoe | |
| 9,646,260 B1 | 5/2017 | Tunstall-Pedoe et al. | |
| 9,805,089 B2 | 10/2017 | Tunstall-Pedoe et al. | |
| 2010/0082639 A1* | 4/2010 | Li | G06F 17/30675 707/748 |
| 2011/0307435 A1* | 12/2011 | Overell | G06F 17/278 706/46 |

(Continued)

OTHER PUBLICATIONS

Nickel et al., Factorizing YAGO, WWWW (2012) at pp. 271-280 (Year: 2012).*

(Continued)

*Primary Examiner* — Ann J Lo
*Assistant Examiner* — Oluwatosin O Alabi
(74) *Attorney, Agent, or Firm* — Weaver Austin Villeneuve & Sampson LLP

(57) ABSTRACT

Techniques are described for determining the value of individual facts in a knowledge base, and various applications of such fact values. In one example, the knowledge base is part of a question answering system. A ranking of knowledge base facts based on the number of times each of the knowledge base facts is used in answering user questions (e.g., as determined from question answering logs) is used to derive a fact value function that may then be used to determine the value of other facts included in or subsequently added to the knowledge base.

23 Claims, 5 Drawing Sheets

(56) References Cited

U.S. PATENT DOCUMENTS

| | | |
|---|---|---|
| 2013/0253913 A1 | 9/2013 | Tunstall-Pedoe |
| 2013/0262125 A1 | 10/2013 | Tunstall-Pedoe |
| 2013/0275121 A1 | 10/2013 | Tunstall-Pedoe |
| 2014/0006328 A1* | 1/2014 | Blanco ............ G06F 16/95 706/46 |
| 2015/0356463 A1 | 12/2015 | Overell et al. |
| 2016/0012051 A1* | 1/2016 | Zoryn ........... G06F 17/30864 707/739 |
| 2016/0103910 A1* | 4/2016 | Kim ............... G16H 20/60 707/738 |
| 2018/0096025 A1 | 4/2018 | Tunstall-Pedoe et al. |

OTHER PUBLICATIONS

Lathia, et al., The Effect of Correlation Coefficients on Communities of Recommenders, ACM Symp. on Applied Computing (2008) at pp. 2000-2005 (Year: 2008).*

Franz et al., TripleRank: Ranking Semantic Web Data by Tensor Decomposition, ISWC '09 (2009) at pp. 213-228 (Year: 2009).*

Chen, Z., & Ji, H. (Jul. 2011). Collaborative ranking: A case study on entity linking. In Proceedings of the Conference on Empirical Methods in Natural Language Processing (pp. 771-781). Association for Computational Linguistics. (Year: 2011).*

Xia, F., Liu, T. Y., Wang, J., Zhang, W., & Li, H. (Jul. 2008). Listwise approach to learning to rank: theory and algorithm. In Proceedings of the 25th international conference on Machine learning (pp. 1192-1199). (Year: 2008).*

Dali, L., Fortuna, B., Duc, T. T., & Mladenić, D. (May 2012). Query-independent learning to rank for rdf entity search. In Extended Semantic Web Conference (pp. 484-498). Springer, Berlin, Heidelberg. (Year: 2012).*

Xia, et al. "Listwise Approach to Learning to Rank—Theory and Algorithm," Appearing in the *Proceedings of the 25 th International Conferenceon Machine Learning*, Helsinki, Finland, 2008 (8 Pages).

Peyrard "Compute metric to predict facts," Master Thesis, Technische Universitat Darmstadt, Jul. 2015 (30 Pages).

* cited by examiner

| left object | relation | right object | count |
|---|---|---|---|
| paris | is the capital of | france | 8 |
| paris | is located within | france | 4 |
| berlin | is the capital of | germany | 6 |
| france | is an instance of | nation state | 2 |
| berlin | is an instance of | city | 4 |
| barack obama | is the president of | usa | 5 |
| male | applies to | barack obama | 3 |
| barack obama | is an instance of | human being | 2 |
| barack obama | is an instance of | president | 1 |
| barack obama | is married to | michelle obama | 3 |
| female | applies to | michelle obama | 2 |

Table 1

FIG. 3

| left object | relation | right object |
|---|---|---|
| paris | is the capital of | france |
| paris | is located within | france |
| berlin | is the capital of | germany |
| france | is an instance of | nation state |
| berlin | is an instance of | city |
| barack obama | is the president of | usa |
| male | applies to | barack obama |
| barack obama | is an instance of | human being |
| barack obama | is an instance of | president |
| michelle obama | is married to | barack obama |
| female | applies to | michelle obama |
| paris | is an instance of | city |
| germany | is an instance of | nation state |
| michelle obama | is an instance of | human being |
| usa | is an instance of | nation state |
| chicago | is located within | usa |
| washington | is the capital of | usa |
| american dollar | is the money of | usa |

Table 2

| object | feature vector |
|---|---|
| berlin | [1,0,0,0,0,0,0,1,0,0] |
| paris | [1,1,0,0,0,0,0,1,0,0] |
| france | [1,1,0,0,0,0,1,0,0,0] |
| usa | [1,1,1,0,0,0,1,0,0,0] |
| barack obama | [0,0,1,1,1,0,0,0,1,1] |
| city | [0,0,0,0,0,0,0,1,0,0] |

Table 3

| relation | feature vector |
|---|---|
| is the capital of | [1,0,0,0,0,0] |
| is married to | [0,0,0,1,0,0] |
| applies to | [0,0,0,0,1,0] |
| is an instance of | [0,0,0,0,0,1] |

Table 4

*FIG. 4*

DETERMINING THE VALUE OF FACTS IN A KNOWLEDGE BASE AND RELATED TECHNIQUES

BACKGROUND

One of the ongoing challenges for a knowledge representation system is the accumulation of knowledge represented in the underlying knowledge base. Reliance on knowledge addition techniques that require much in the way of human intervention are simply not scalable for capturing more than a small slice of the ever-increasing scope of human knowledge. With the help of machine learning, some progress has been made in developing automated techniques that can mine the vast amount of unstructured or semi-structured information available online for new facts. However, much work remains in terms of improving the accuracy and reliability of such techniques.

BRIEF DESCRIPTION OF THE DRAWINGS

FIG. 3 shows a simplified representation of fact usage counts derived from question answering log data.

FIG. 4 illustrates an example of the representation of knowledge base facts using feature sets.

DETAILED DESCRIPTION

This disclosure describes techniques for determining the value of individual facts in a knowledge base, and various applications of such fact values. In one example, the knowledge base is part of a question answering system that translates natural language input (e.g., questions from human users) to an internal query format compatible with the structured data of the knowledge base. The internal queries derived from the natural language input are executed to identify relevant facts in the knowledge base that are used to construct natural language responses to the natural language input. The number of times that particular knowledge base facts are used to respond to such natural language input (e.g., as determined from question answering logs) is used to derive a fact value function that may then be used to determine the value of other facts included in or subsequently added to the knowledge base. The underlying assumption in this context is that the more a fact is used to answer questions, the more valuable it is.

A set of knowledge base facts is ranked according to the number of times that each of the facts appears in the system's question answering logs during some period of time (e.g., a day, a week, a month, etc.) or during multiple such periods. Each of the facts is represented by a set of features. This training data is used to derive the fact value function.

Each of the features in a feature set represents a particular characteristic of the corresponding fact. Such characteristics might include very broad characteristics such as, for example, class information (e.g., this fact is about a person of the class "movie star"), but might also include very narrow characteristics such as, for example, facts about a particular person (e.g., this fact is about a specific movie star). For example, a fact might be constructed from three database objects (in brackets) and look something like [Tom Cruise] [is an instance of] [movie star]. The feature set for this fact would include a value representing that the fact is about the actor Tom Cruise, and another value representing that the fact is about a movie star.

Of particular interest are the characteristics of the facts in the training data that make them useful for answering questions. The relative value of these characteristics may be represented by a function of the features representing the characteristics (i.e., a fact value function) that, when applied to the facts represented in the training data, achieves the same or a substantially similar ranking of those facts as was obtained from the question answering log data. In one example, a "learning to rank" technique (e.g., ListMLE) is used to derive (and refine) such a fact value function. The fact value function may then be used to determine fact values of other facts (whether or not in the knowledge base) for a wide range of applications.

Figure 1:
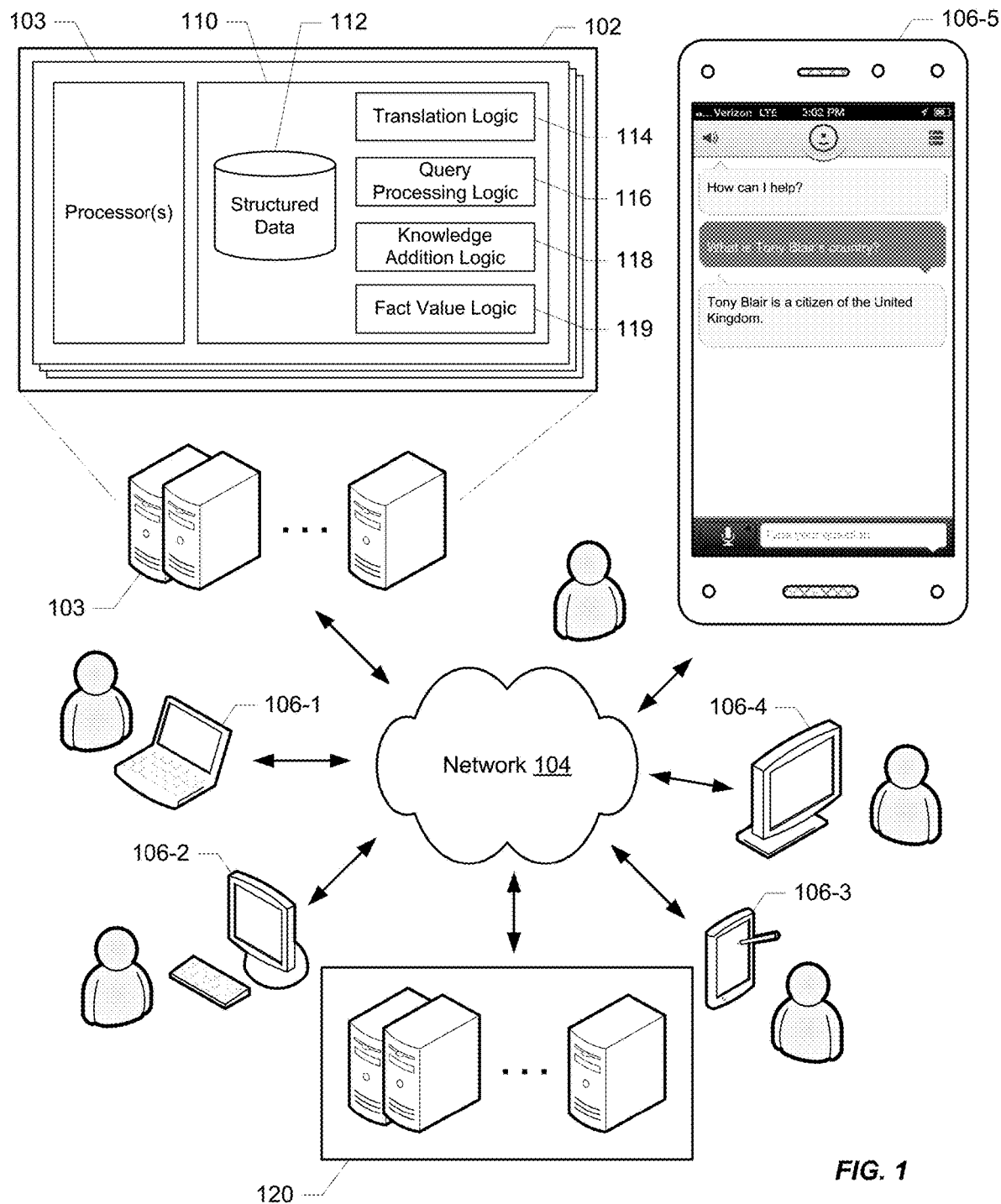
FIG. 1 is a simplified diagram of a computing environment in which various implementations may be practiced.

FIG. 1 illustrates an example of a computing environment in which users interact with a knowledge representation system 102 via network 104 using a variety of client devices 106 associated with the corresponding users. Knowledge representation system 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by service 102. Such devices may include, for example, mobile devices (e.g., cell phones, smart phones, tablets, smart watches and other wearable devices, etc.), personal computers (e.g., laptops and desktops), set top boxes (e.g., for cable and satellite systems), smart televisions, gaming consoles, etc. In addition, at least some of the examples described herein contemplate various distributed computing implementations, e.g., implementations based on computing models capable of enabling ubiquitous, convenient, on-demand network access to a shared pool of computing resources (e.g., networks, servers, storage, applications, and services).

It should also be noted that, despite references to particular computing paradigms and software tools, the computer program instructions on which various implementations are based may correspond to any of a wide variety of programming languages, software tools and data formats, and may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

In one example, knowledge representation system 102 is an information service for filling information needs (e.g., question answering) using a knowledge base 110 that stores information as structured data 112 (e.g., data stored in a relational database, spreadsheet, etc.). Knowledge base 110 includes translation logic 114 which translates between natural language and an internal format that is compatible with structured data 112. That is, translation logic 114 translates natural language input (e.g., captured speech or entered text received from device 106-5) to internal queries that are then processed using structured data 112. Translation logic 114 also translates responsive data from structured data 112 (i.e., knowledge base data returned in response to the internal queries) and/or its own internal queries requiring further input to natural language for presentation to the user (e.g., on device 106-5). The latter might occur, for example, where the natural language input results in conflicting or ambiguous internal queries, in which case the internal queries could be translated back to natural language and presented to the user to select the correct interpretation. Query processing logic 116 processes internal queries generated by translation logic 114 using structured data 112 to generate responses which may then be translated to natural language by translation logic 114. Knowledge addition logic 118 represents a wide variety of manual and automated techniques for adding facts to knowledge base 110.

Structured data 112 may represent knowledge as a collection of facts; representing the facts with relation objects that express semantic relations between entities (represented by the entity objects). A fact includes at least one of these entity-relation-entity "triples." For example, the fact [paris] [is the capital of] [france] states a relation, i.e., [is the capital of], between two entity objects, i.e., [paris] and [france]. A fact may also include other information, e.g., temporal information indicating when the fact is (or was) valid, contextual information indicating a context in which the fact is true, etc. For example, a fact (e.g., [fact1]) expressing a relationship that can change might have a link to a temporal constraint expressed like [fact1] [applies for timeperiod] [timeperiod:[timepoint: "1975"]; [iafter] which makes an assertion about [fact1] namely that it has been true since 1975 and will be true for the indefinite future. An example of contextual information is a link between a fact and a particular context (e.g., a fictional context such as the Lord of the Rings) in which that fact is true. It should also be noted that structured data 112 might represent the relation between entities without using a relation object. That is, the relation may be represented using other types of data that explicitly or implicitly represent the connection between two entities (i.e., relation data). For example, the relation between two entities might be represented by connections between database table entries. Other suitable ways of representing such relations will be understood to those of skill in the art.

And although particular implementations are described herein with reference to question answering systems and knowledge bases characterized by specific details, it will be understood that the various functionalities described herein are much more widely applicable. That is, the techniques described herein may be used to support knowledge addition in a broad range of knowledge representation systems. The scope of the invention should therefore not be limited to the specific examples described herein.

Figure 2:
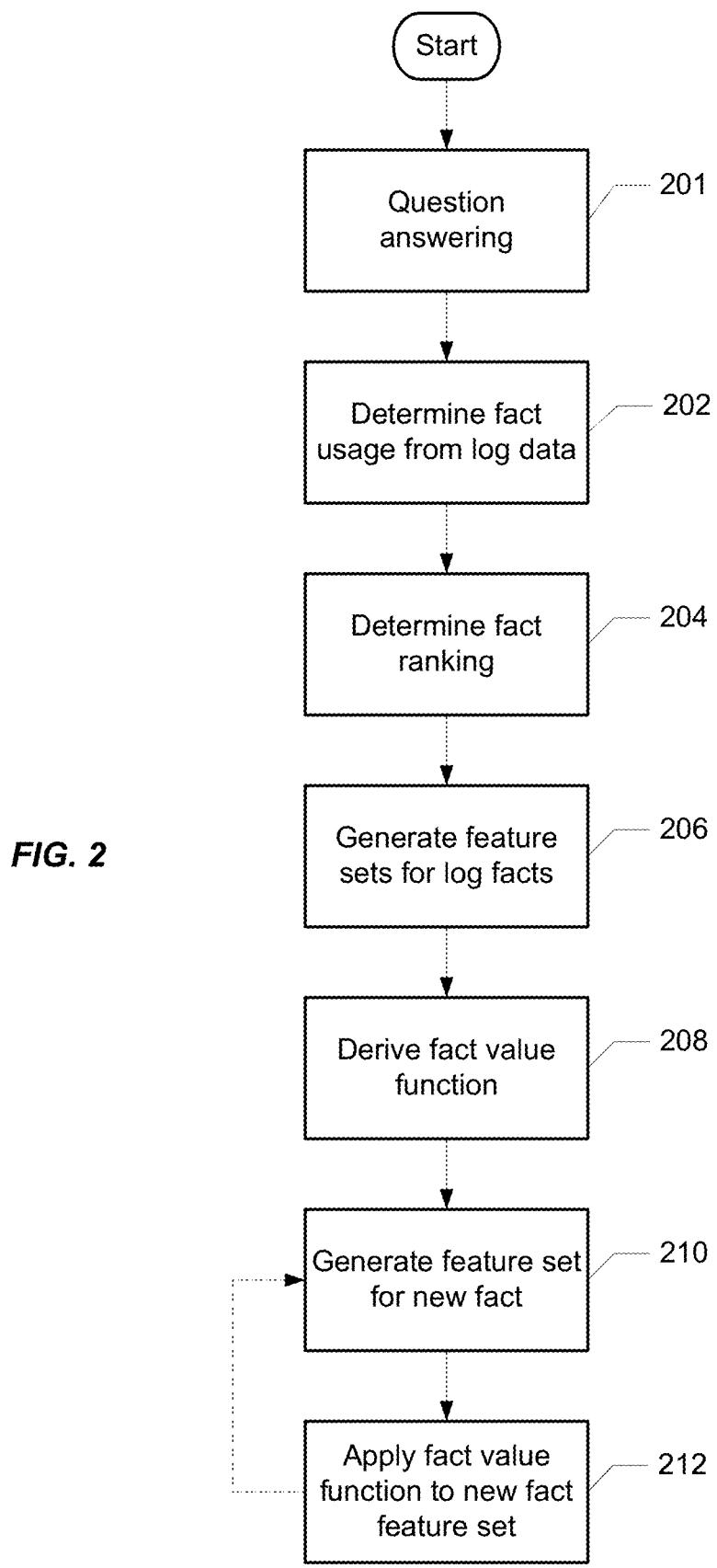
FIG. 2 is a flowchart illustrating one approach to deriving a fact value function.

In one example, knowledge base 110 includes fact value logic 119 which is configured to determine a value for each of the facts represented in knowledge base 110. And while fact value logic is shown as being included within knowledge representation system 102 as part of knowledge base 110, it should be noted that this is merely by way of example and for the sake of clarity, and that implementations are contemplated in which, for example, fact value logic may reside on a separate platform which may be under control of an independent entity (e.g., as represented by computing platform 120). An example of the operation of a specific implementation of fact value logic will now be described with reference to the flow diagram of FIG. 2.

As discussed above, the process of answering a question starts by translation of the question from natural language into one or more internal queries which are the knowledge base's internal representation of the natural language question. The natural language question may be received in a variety of ways. For example, the question could be captured as audio input such as a user speaking into a microphone on a mobile device. The captured speech may then be translated to text by any of a variety of speech-to-text translation techniques. Alternatively, the question could be received in text form, e.g., from a user using an actual or virtual keyboard. As another alternative, the question could be recognized from preexisting text using, for example, a character recognition technique. However a question is received, the query(ies) derived from the questions is(are) executed to identify responsive information (i.e., knowledge base facts) in the knowledge base from which a response to the natural language question may be generated (201).

In one example, the lines of a query look very much like a series of facts, but the purpose of these query lines is to see whether they can be justified from knowledge found in or inferred from the knowledge base rather than to assert information. Variables can also represent objects in queries. For example:

query
  f: [William Jefferson Clinton] [is married to] [hillary Clinton]
  f [applies at timepoint] [timepoint: ["1999/6/3"]]
represents the question "Was Bill Clinton married to Hillary Clinton on the $3^{rd}$ of June 1999?"

Notice how the name of the first query line is given a variable f. In processing the query the engine will solve for f with every possible fact in the knowledge base that asserts that relationship between Bill and Hillary Clinton, and then try to satisfy the second line using those results. Provided both lines can be satisfied with at least one value of f the response to the question will be "Yes."

Variables can also be used in place of other objects in the facts. For example:

query a
  f: a [is married to] [hillary Clinton]
  f [applies at timepoint] [timepoint: ["1999/6/3"]]
represents the question "Who was married to Hillary Clinton on the $3^{rd}$ of June 1999?"

If the query is requesting objects as the answer, one or more variables that represent the desired objects follow the "query" statement. If the query is just trying to determine the truth of the question we term it a truth query and it has no variables after the "query" statement. Queries whose purpose is to produce one or more named objects as answers are termed object queries. The above query with the a missing from the query statement would represent the question "Was anyone married to Hillary Clinton on the $3^{rd}$ of June 1999?"

A more complicated query is the following:
query a
  a [is an instance of] [nation state]
  t: a [is geographically located within] [the continent of Europe]
  t [applies at timepoint] [timepoint: ["1999"]]
  t1: f [is the capital of] t
  t1 [applies at timepoint] [timepoint: ["1999"]]
  f [commonly translates as] d
  c [is the first letter of] d
  c [equals] ["p"]

which represents the question "Which continental European countries have capital cities whose names start with a 'p' in 1999?"

Query processing involves searching the knowledge base for objects that are solutions to the first line of the query, giving a list of possible substitutions for the variables. Each of these substitutions corresponds to a particular knowledge base fact, e.g., [Australia] [is an instance of] [nation state]). New queries are then created for all subsequent lines of the query (if any) with references to the first-line variables replaced for the solved objects. These new queries are then recursively solved and any results combined with the results from the first line. Thus, the processing of a query representing a single natural language question may involve many knowledge base facts.

A subset of the knowledge base facts used in processing the query(ies) are then used to generate a natural language response to the question. This may be done by translating at least some of the facts using other knowledge base facts that relate particular knowledge base objects with natural language strings. For example, the relation object [commonly translates as] relates a knowledge base object to a string giving the usual natural language term. In another example, the relation object [uniquely translates as] relates an object to a longer translation which is hoped to be unique. The virtue of this version is that it uniquely identifies the object in plain English with little chance of ambiguity but it contributes to highly wordy translations when used. Relation objects are provisionally translated into a present-tense verb phrase. This can be modified to a negative or to an alternative tense using the rules of grammar.

Referring again to FIG. 2, the knowledge base facts used to answer the natural language questions are stored in question answering logs (e.g., with structured data 112 or in some other data store). The question answering log data includes a log entry for each natural language question that identifies each of the knowledge base facts used in the answering of that question. For example, the log data might include an entry for a particular question (e.g., as identified by a user ID and a time stamp) with a list of knowledge base fact identifiers that uniquely identify each of the facts used in the answering of that question. From the question answering log data, the number of times a given fact is used to answer a question is counted (202). In some cases there may be multiple facts that lead to an answer. There may also be many questions for which a given fact was used. Each use is counted. An example of such counts derived from question answering log data is shown in Table 1 of FIG. 3 which shows a set of facts (including the left, right, and relation objects) and the number of times each fact was used in question answering.

These counts determine an ordered list or ranking of knowledge base facts (204). As will be discussed, this ranking is used to discover a function (i.e., a fact value function) of the features representing fact characteristics to rank these same facts in a way that results in this same or a substantially similar order. The fact value function may then be used to score facts not included in the ranking (with high scores meaning the facts are similarly useful for answering questions as the facts that were used frequently in the question answering log data).

Each of the knowledge base facts in the ordered list is represented by a feature set (206). In one example, this representation is a combination of feature sets representing the component objects of the fact triple, i.e., the left entity object, the relation object, and the right entity object. Each entity object is represented as a feature set, e.g., a binary feature vector, in which the features in the set correspond to the relation objects in the knowledge base with which that entity object is associated (i.e., in a fact triple). Each relation object is represented as a feature set in which (with some exceptions discussed below) there is non-zero value only for that relation object, i.e., all other values in the feature set are zeroes because a relation object is not typically associated with other relation objects). The feature sets for the entity and relation objects are combined (e.g., the feature vectors are concatenated) to form the feature set for the fact.

For most facts in the knowledge base, the mere presence of a relation object is strongly representative of the kind of fact. For example, inclusion in a fact of the relation object [is the capital of] strongly indicates that the fact is about a capital city (represented by the left entity object of the fact) of some geographic region (represented by the right entity object). However, in the case of two particular relation objects, the presence of either of the relation objects in a fact is uninformative. The relation object [app lies to] links an entity object to another entity object representing some attribute or adjectival state of the former entity object, e.g., such as [male], [female], or [green]. This relation object does not carry much information by itself in that it can represent any attribute or state of any entity. However, when combined with a counterpart entity object, e.g., [female] [applies to], it becomes clear that any fact including this combination is about an entity that can be characterized as "female." That is, in combination with an attribute or adjectival state, the relation object [app lies to] becomes more representative of the kind of fact in which it is included. The feature set representing the relation object [app lies to] is therefore expanded to include a feature for each combination of the [app lies to] relation object and an entity object representing a particular attribute. A similar expansion of the feature set is done for the relation object [is an instance of] because, like the [applies to] relation object, it is not, by itself informative of the kind of fact in which it is included. However, in this case, the feature set is expanded to include a feature for each combination of the [is an instance of] relation object with an entity object representing a particular class of entities, e.g., [is an instance of] [city] or [is an instance of] [human].

An example of a set of knowledge base facts (which includes the facts represented in the data of Table 1), and the feature vector representations of some of the entity objects included in the set of facts is illustrated in Tables 2 and 3, respectively, of FIG. 4. It is useful to note that the vector representations in Table 3 use information in the larger set of facts that is not included in the question answering log data. So, for example, even though some of the facts that include the entity object [usa] were not in the logs, they help to build a feature vector that encodes meaningful information and captures semantic signals. The feature vectors for [france] and [usa] are similar because they have a similar structure and the same class hierarchy (i.e., because they are both of the same class). Examples of feature vectors for some of the relation objects in the set of fact of Table 2 are shown in Table 4.

Using the examples of Tables 2-4, the feature vector for the fact [ber 1 in] [is an instance of] [city] can be constructed by concatenating the feature vectors for its constituent objects as follows:

[1,0,0,0,0,0,0,1,0,0],[0,0,0,0,0,1],[0,0,0,0,0,0,0,1,0,0]

1

[1,0,0,0,0,0,0,1,0,0,0,0,0,0,1,0,0,0,0,0,0,0,1,0,0]

Likewise, the feature vector for [paris] [is the capital of] [france] is:

[1,1,0,0,0,0,0,1,0,0,1,0,0,0,0,0,1,1,0,0,0,0,1,0,0,0]

As will be appreciated, given the large number of possibilities and the relatively few associations in a knowledge base that includes millions of facts, what results for each fact in the ordered list is a very sparse vector in which a few values are 1's, but most are 0's. As will also be appreciated, machine learning with such sparse vectors can be done very efficiently.

It should also be noted that, while implementations are described herein in which the unit of information being represented and ranked and for which values are calculated is a fact triple, implementations are contemplated in which other units of information can be similarly processed. For example, the combination of an entity object and a relation object (i.e., without a second entity object) might be a useful unit of information for some applications. In such a case, the relevant feature set would be a combination of the two feature sets for the combined objects. For other applications, it might be useful to use the feature sets for individual knowledge base objects, e.g., just entity objects or just relation objects, as knowing the relative importance of individual objects could support a range of applications and decision-making. The scope of this disclosure should therefore not be limited to deriving fact value functions and calculating fact values for fact triples.

Using the ranking of the knowledge base facts and the corresponding feature sets, a fact value function of the features is derived that results in a ranking of the knowledge base facts that is the same, or substantially similar to the ranking derived from the question answering log data (208). It should be noted that, while deriving a fact value function that generates the same ranking as the target ranking may be desirable and achievable, implementations are contemplated in which the fact value function arrived at generates a ranking that may differ from the target ranking in some respects. It should also be noted that the data on which the target ranking is based may have a relatively small number of facts for which the usage is high, and many other facts for which the number of uses is very small, e.g., some facts may only be used once. Thus, it may be useful or even necessary in some cases to employ data smoothing techniques to the usage counts derived from the query answering log data prior to derivation of the fact value function. Those of skill in the art will appreciate the range of suitable data smoothing techniques.

In one example, the ranking of facts derived from the log data corresponds to the maximum point in a convex space in which all orderings are represented, with the most similar orderings in the space being closest in the space to the maximum. Different functions are scored by how close they get in the convex space to the maximum. According to a more specific implementation, a "Learn to Rank Facts" machine learning technique known as ListMLE is used to derive the fact value function.

ListMLE is a listwise technique that minimizes a likelihood loss function defined by:

$$L(f_\theta(x), y) = -\log P(y|x; f_\theta) \text{ where } P(y|x; f_\theta) = \prod_{i=1}^{n} \frac{\phi(Y_{\sigma(i)})}{\sum_{k=1}^{n} \phi(Y_{\sigma(k)})}$$

$\phi$ can be any positive and increasing differentiable function on R (a common choice is exp). $P(y|x;f_\theta)$ defines a parameterized exponential probability distribution over permutations given the predicted result. This probability distribution is a Plackett-Luce model.

In order to understand this probability distribution we can assume the "true" score $y_i$ are integers. We look at a set where each item i appears $y_i$ times. The probability that we pick the item k first is given by:

$$\frac{Y_\sigma(i)}{\sum_{k=1}^{n} Y_\sigma(k)}.$$

Next we are not interested in k any more (it is already the first item of the permutation) and we repeat the process with the other items. With this process we get the probability of picking the items in a given order. All events are independent therefore we get P by multiplying the individual probabilities of each item. Plackett-Luce distribution offers a generalization of this view.

The likelihood loss function can be proved to be order sensitive. If for two permutations, all items have the same rank, except items i and j are switched and $y_i > y_j$, then the permutation with the higher probability is the one which ranks i first. From that we can observe that the permutation with the highest probability is the target permutation (orders element in decreasing orders of y). Since $L(f_\theta(x),y)$ is differentiable and convex, we can straightforwardly optimize it.

When the loss function is not convex, a range of criteria may be used to determine when to stop iterating such as, for example, when further iterations stop improving (decreasing) the value for the loss function, i.e., when further training does not push the ranking of the fact value function any closer to the target ranking. Alternatively, iterating may be stopped when the change in the value for the loss function becomes lower than some threshold, epsilon, a training hyper-parameter the actual value for which depends on the training method used.

Once a fact value function is derived that achieves (or gets sufficiently close to) the target ranking, the function may be applied to any individual fact to get a score for the fact that represents its value. This may be done for each such fact by generating its feature set (210), and applying the fact value function to the feature set to generate a corresponding fact value (212). As will be appreciated, this may be iterated over a set of facts; including the entire knowledge base (as represented by the dashed arrow).

The raw score of the fact value function may be an ordinal on an arbitrary scale (e.g., a floating point value), but there may be applications in which normalization or scaling of the fact value is desirable, e.g., so the fact values can be mathematically combined or otherwise aggregated. Normalization might be achieved, for example, using a linear mapping of a set of fact values to some interval or range, e.g., the interval [0,1] where 0 corresponds to the smallest value in the set and 1 to the largest. In one example, if there is an independent measure of the financial benefit of answering a single question, then a fact value could be scaled to correspond to monetary units. And if there is an independent measure of the marginal cost of maintaining a fact in a knowledge base, then a fact value in monetary units could be compared to that cost. In some cases the marginal cost of having a fact in a knowledge base could vary depending on the deployment environment. For example, there might be a need to deploy a reduced scale knowledge base accessible on some embedded device. Where costs can be compared to scaled fact values, this supports reducing the scale of the knowledge base to an optimal size by eliminating facts whose cost is greater than their value.

Generating an aggregate score for a set of facts might be done in any of a variety of ways such as, for example, computing an average of the fact values, selecting the maximum value, counting the percentage of facts for which the fact values are above a given threshold (e.g., the average fact value of an entire knowledge base), scaling the fact values using a scaling factor and then adding the scaled values, etc. As will be appreciated, the ways in which fact values may aggregated or combined are many and diverse, and may depend on the particular application.

Moreover, once a fact value function is derived, the features represented in the function can be inspected to actually understand what features contribute to making a fact valuable (i.e., what features in the fact vectors contribute to the score) and what features do not. Such information might be useful, for example, in identifying new applications for fact values derived from such a function.

As mentioned above, the range of applications for fact value functions and the fact values generated by such functions is broad and diverse. Many such applications can be broadly represented by the flowchart of FIG. 5 in which information is retrieved (502), a set of facts is generated from the information (504), and the facts are represented as feature sets (506). As will be appreciated from the foregoing description, the relevant feature set for a given set of facts corresponds to the features represented in a fact value function derived for the particular application. It should also be noted that the feature set generated for a given set of facts may only be a subset of the features represented in a fact value function (e.g., only the features that contribute the most to the values generated by the function). Alternatively, the set of features represented in the fact value function may be a subset of the feature sets generated for the set of facts. These situations allow for the use of a fact value function with fact feature sets that may have been generated for other purposes.

Once the facts are represented by corresponding features sets, fact values for each may be generated using the fact value function (508). The fact values may then be aggregated (510) to generate an overall score for the set of facts which may then be used to take action or drive decision making (512), the nature of which will depend on the particular application.

For example, fact value functions and fact values may be used in this manner in support of the addition of knowledge (e.g., new facts) to a knowledge base. As alluded to above, the structured representation of all of human knowledge is a daunting technical problem; particularly given the rate at which the number of knowable things (i.e., facts) increases over time. Given the nature of the problem, an important and growing area of research and development in knowledge representation systems has been the design and use of automated and machine-learning techniques for knowledge addition. However, in many cases, it may be difficult to direct the focus or assess the effectiveness of such techniques in a consistent and efficient manner.

According to various implementations and as mentioned above, fact values for a set of facts may be combined or aggregated. This may be particularly useful in the context of knowledge addition in a variety of ways. For example, generating an aggregate score based on the fact values of a set of facts can allow for the evaluation of particular sources of information for knowledge addition. That is, some knowledge addition techniques extract information from online sources. However, the quality of the information sources may vary dramatically, potentially resulting in the addition of low quality or inaccurate information to a knowledge base. Using a fact value function to calculate fact values for facts derived from a particular information source, and then aggregating those fact values to determine a score for the information source can provide a reliable mechanism for evaluation of the quality of an information source for knowledge addition, and support decision making around the targeting of particular sources of information for knowledge addition in the future.

Such an evaluation might be done on a new information source before knowledge addition begins. For example, the information available on the new source may be sampled, and a set of facts generated from the sampled information. The set of facts can then be scored using a fact value function to determine whether the new source of information is suitable.

New areas of information in which to focus knowledge addition can also be identified using fact values. For some knowledge bases, relation objects used to construct fact triples can be thought of as representing a particular type or area of information. New knowledge addition can focus on the relations (and the classes of entities relevant to those relations) that are the most important. For example, the relation objects [has the birth date] and [is the capital of] might be determined to be important using a fact value function that scores the facts in which those relation objects are included. This might then support a decision to focus subsequent knowledge addition efforts on acquiring new facts about birthdays and capital cities.

The effectiveness of knowledge addition techniques may also be evaluated using fact values. Different techniques or different configurations of the same technique may target an information source or set of information sources, each technique or configuration generating a set of facts from the same information. The different sets of facts can be evaluated using a fact value function that scores the facts in each, with an aggregate score for each set being determined for comparison. This information could then be used to drive decisions about which techniques to use, as well as to help with fine tuning the configurations of a particular technique to get the highest quality facts.

And even though automated knowledge addition techniques may be preferred for most knowledge bases, there continues to be a need for the manual addition of knowledge by humans. This is exemplified by crowd-sourced information sites such as, for example, Wikipedia, that provide user interfaces in which contributing users can input factual information (e.g., via speech-to-text conversion, a virtual keyboard, text recognition, etc.). Fact value functions and fact values can be used in such contexts to evaluate, for example, the value of the information provided by individual users. Again, facts and corresponding feature sets can be generated from the information provided by a contributing user, and the fact values aggregated to determine the overall value of the information. This might be useful, for example, to identify (and potentially reward) individuals who provide high-value information, to soliciting further contributions from such individuals generally and/or relating to a particular topic or category of information, as well as to restrict or ban individuals that provide low-value information.

Figure 5:
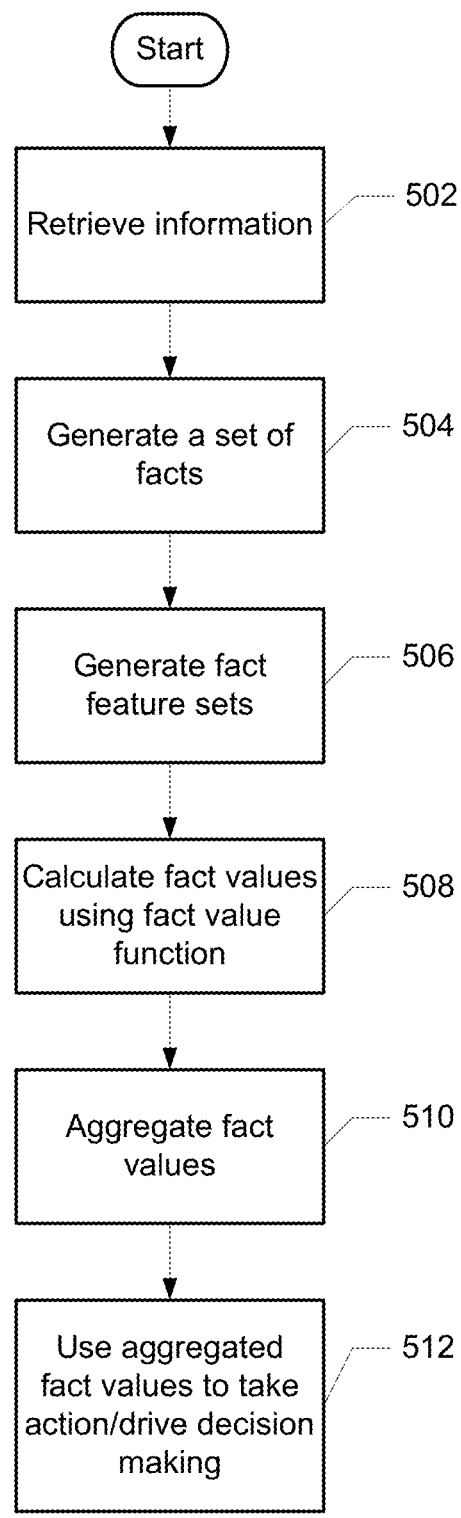
FIG. 5 is a flowchart illustrating the use of fact value functions and fact values.

Fact value functions and fact values may also be used outside of the context of knowledge addition to support a broad range of applications. In one example, these tools may be used to assess the economic value of information. For example, a large and growing online market exist for the sale and use of information (e.g., consumer information), with the business models of may online businesses being based on the value of such information. However, there are limited ways in which the purchaser of such information can assess its value or identify the most relevant portions of a large corpus of available information. Fact values and fact value functions can be used (e.g., as illustrated in FIG. 5) to determine the value of such information sets (or subsets thereof) so that more intelligent decisions can be made around such transactions.

In another example, individual fact values may be used in support of question answering. For example, a question answering system may use facts stored in a knowledge base to respond to natural language questions from users. The facts that are used to respond to user questions may be selected and/or favored over other facts based on associated fact values generated using a fact value function as enabled by the present disclosure. The fact values may be generated in real time or, alternatively, each of the knowledge base facts may have an associated fact value stored in the knowledge base.

In another example, fact value functions and fact values may be used to support the operation of recommender systems, i.e., information filtering systems that attempt to predict the rating or preference that a user would give to a particular item; often used in the the recommendation of products and services. One of the most commonly used techniques employed for this purpose is referred to as Collaborative Filtering (CF) and involves building a model from a user's past behavior (e.g., items previously purchased or selected and/or numerical ratings given to those items) as well as similar decisions made by other users. The model is then used to predict items (or ratings for items) in which the user may have an interest. The predictions of such models rely on a similarity measure between items. A common choice for this measure is the cosine similarity.

If two items $f_i$ and $f_j$ are represented by the feature vectors:

$$\vec{x}_i = (x_{i1} \ldots x_{im}) \text{ and } \vec{x}_j = (x_{j1} \ldots x_{jm})$$

the cosine similarity is defined as:

$$sim(f_i, f_j) = \cos(\theta_{fifj}) = \frac{\vec{x}_i \cdot \vec{x}_j}{\|\vec{x}_i\|\|\vec{x}_j\|} = \frac{\sum_{k=1}^{m} x_{ik} x_{jk}}{\sqrt{\sum_{k=1}^{m} x_{ik}^2} \sqrt{\sum_{k=1}^{m} x_{jk}^2}}$$

If we have a fact value for some items we can predict the fact value of a new item by computing a weighted average of the fact values of the known items. The weights are the similarities between the new item and the known ones. As will be appreciated, the set of facts from which such a fact value function is derived will relate to a particular user or category of user. For example, if the original set of facts is from question answering log data, that data may be filtered to identify and determine counts for facts that were used to answer questions of a particular user or set of users (e.g., with similar demographic characteristics). The fact value function that is derived as described above will then be useful in terms of predicting the value of facts for that particular user or set of users.

For example, three two-dimensional feature sets representing three items for which fact values have been generated (target (yi)):

| item Id | features ($\vec{x}_i$) | target($y_i$) |
|---|---|---|
| item1 | [1,3] | 14 |
| item2 | [3,3] | 10 |
| item3 | [3,1] | 9 |

The predicted fact value for a new item represented by the feature set [2,3] is given by:

$$S([2, 3]) = \frac{sim([1, 3], [2, 3]) * 14 + sim([3, 3], [2, 3]) * 10 + sim([3, 1], [2, 3]) * 9}{sim([1, 3], [2, 3]) + sim([3, 3], [2, 3]) + sim([3, 1], [2, 3])}$$

$$S([2, 3]) \approx \frac{1.63 * 14 + 1.91 * 10 + 1.32 * 9}{1.63 + 1.91 + 1.32} \approx 11$$

As will be appreciated, such information would be useful in the recommendation of products and services.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   receiving, with a computing system, natural language queries from a population of users;
   generating, by the computing system, natural language responses to the natural language queries using knowledge base facts of a knowledge base to which the computing system has access, the knowledge base being configured to represent knowledge using structured data and including a plurality of entity objects and a plurality of relation objects, each of the knowledge base facts including two of the entity objects and a relation object representing a relationship between the two entity objects;
   generating, by the computing system, question answering log data identifying first knowledge base facts of the knowledge base facts, the first knowledge base facts being specified by the question answering log data as having been used to generate the natural language responses;
   generating, using one or more computing devices, a count for each of the first knowledge base facts, each count representing a number of times the corresponding first knowledge base fact appears in the question answering log data;
   ordering, using the one or more computing devices, first knowledge base facts using the counts resulting in a first ranking of the first knowledge base facts;

representing, using the one or more computing devices, each of the first knowledge base facts as a set of features, each of the features being a numeric value corresponding to one of the relation objects of the knowledge base and representing a characteristic of the corresponding first knowledge base fact, the set of features for each first knowledge base fact including a corresponding nonzero feature for each of the relation objects in the knowledge base with which either of the two entity objects of the knowledge base fact is included in at least one of the other knowledge base facts in the knowledge base;

deriving, using the one or more computing devices and a learning-to-rank technique, a fact value function of the features that generates a second ranking of the first knowledge base facts based on the sets of features, the second ranking being substantially the same as the first ranking;

retrieving, using the one or more computing devices, a second knowledge base fact of the knowledge base facts, the second knowledge base fact including two of the entity objects;

representing, using the one or more computing devices, the second knowledge base fact as a set of features, the set of features for the second knowledge base fact including a corresponding feature for each of the relation objects in the knowledge base with which either of the two entity objects of the second knowledge base fact is included in at least one of the other knowledge base facts in the knowledge base;

generating, using the one or more computing devices, a fact value for the second knowledge base fact using the fact value function and the corresponding set of features; and using the fact value for the second knowledge base fact as input to an automated knowledge addition process for the knowledge base.

2. The method of claim 1, wherein deriving the fact value function comprises using the ListMLE listwise technique to generate the second ranking by generating a succession of intermediate rankings of the first knowledge base facts and minimizing a loss function representing differences between the first ranking and each of the intermediate rankings.

3. The method of claim 1, further comprising:
generating a plurality of third knowledge base facts for inclusion in the knowledge base;
determining an aggregate value for the third knowledge base facts using the fact value function; and
using the aggregate value, generating a first score for a knowledge acquisition technique by which the third knowledge base facts were generated, or a second score for an information source from which the third knowledge base facts were derived.

4. The method of claim 1, further comprising:
receiving a first query;
processing the first query resulting in identification of a plurality of facts including a third knowledge base fact;
selecting the third knowledge base fact based on the corresponding fact value generated using the fact value function; and
generating a response to the first query using the third knowledge base fact.

5. The method of claim 1, further comprising:
extracting a plurality of facts from one or more information sources;
generating a fact value for each of the facts using the fact value function and a corresponding set of features;
aggregating the fact values;
taking an action based on the aggregated fact values.

6. The method of claim 5, wherein taking the action based on the aggregated fact values comprises one of:
targeting a first information source or a category of information for knowledge acquisition;
selecting one of a plurality of knowledge acquisition techniques for knowledge acquisition;
configuring a first knowledge acquisition technique for knowledge acquisition; or
rating a second information source in connection with knowledge acquisition.

7. The method of claim 1, further comprising:
receiving a plurality of facts related to a particular user or set of users from one or more information sources;
generating a fact value for each of the facts using the fact value function and a corresponding set of features;
aggregating the fact values; and
taking an action relating to the particular user or set of users based on the aggregated fact values.

8. The method of claim 7, wherein aggregating the fact values includes:
generating a set of features for a new fact related to the particular user or set of users;
determining a similarity measure for the new fact and each of the plurality of facts using the corresponding sets of features; and
determining a weighted average of the similarity measures, wherein each similarity measure is weighted with a corresponding one of the fact values; and
wherein the one or more computing device are further configured to identify a product or service for recommendation to the particular user based on the weighted average.

9. The method of claim 7, further comprising:
causing interfaces to be presented to the set of users, the interfaces being configured to receive factual information from the users; and
generating the plurality of facts from the factual information; and
wherein aggregating the fact values includes aggregating the fact values corresponding to the factual information received from a particular contributing user.

10. The method of claim 9, wherein taking the action relating to the particular user includes one or more of identifying the particular contributing user as a provider of high-value information, rewarding the particular contributing user, soliciting further contributions from the particular contributing user, soliciting further contributions from the particular contributing user relating to a particular topic or category of information, restricting contributions from the particular contributing user, or banning contributions from the particular contributing user.

11. The method of claim 1, wherein a specific first knowledge base fact includes a first relation object, and wherein the set of features for the specific first knowledge base fact includes a corresponding feature for each combination in the knowledge base of the first relation object and an entity object representing a particular attribute.

12. The method of claim 1, wherein a specific first knowledge base fact includes a first relation object, and wherein the set of features for the specific first knowledge base fact includes a corresponding feature for each combination in the knowledge base of the first relation object and an entity object representing a particular class of entities.

13. A system, comprising one or more computing devices configured to:
- receive natural language queries from a population of users;
- generate natural language responses to the natural language queries using knowledge base facts of a knowledge base to which the computing system has access, the knowledge base being configured to represent knowledge using structured data and including a plurality of entity objects and a plurality of relation objects, each of the knowledge base facts including two of the entity objects and a relation object representing a relationship between the two entity objects;
- generate question answering log data identifying first knowledge base facts of the knowledge base facts, the first knowledge base facts being specified by the question answering log data as having been used to generate the natural language responses;
- generate a count for each of the first knowledge base facts, each count representing a number of times the corresponding first knowledge base fact appears in the question answering log data;
- order first knowledge base facts using the counts resulting in a first ranking of the first knowledge base facts;
- represent each of the first knowledge base facts as a set of features, each of the features being a numeric value corresponding to one of the relation objects of the knowledge base and representing a characteristic of the corresponding first knowledge base fact, the set of features for each first knowledge base fact including a corresponding nonzero feature for each of the relation objects in the knowledge base with which either of the two entity objects of the knowledge base fact is included in at least one of the other knowledge base facts in the knowledge base;
- derive using a learning-to-rank technique a fact value function of the features that generates a second ranking of the first knowledge base facts based on the sets of features, the second ranking being substantially the same as the first ranking;
- retrieve a second knowledge base fact of the knowledge base facts, the second knowledge base fact including two of the entity objects;
- represent the second knowledge base fact as a set of features, the set of features for the second knowledge base fact including a corresponding feature for each of the relation objects in the knowledge base with which either of the two entity objects of the second knowledge base fact is included in at least one of the other knowledge base facts in the knowledge base;
- generate a fact value for the second knowledge base fact using the fact value function and the corresponding set of features; and
- use the fact value for the second knowledge base fact as input to an automated knowledge addition process for the knowledge base.

14. The system of claim 13, wherein the one or more computing devices are further configured to:
- receive a plurality of facts related to a particular user or set of users from one or more information sources;
- generate a fact value for each of the facts using the fact value function and a corresponding set of features;
- aggregate the fact values; and
- take an action relating to the particular user or set of users based on the aggregated fact values.

15. The system of claim 14, wherein the one or more computing devices are configured to aggregate the fact values by:
- generating a set of features for a new fact related to the particular user or set of users;
- determining a similarity measure for the new fact and each of the plurality of facts using the corresponding sets of features; and
- determining a weighted average of the similarity measures, wherein each similarity measure is weighted with a corresponding one of the fact values; and
- wherein the one or more computing device are further configured to identify a product or service for recommendation to the particular user based on the weighted average.

16. The system of claim 14, wherein the one or more computing devices are further configured to:
- cause interfaces to be presented to the set of users, the interfaces being configured to receive factual information from the users; and
- generate the plurality of facts from the factual information;
- wherein the one or more computing devices are configured to aggregate the fact values by aggregating the fact values corresponding to the factual information received from a particular contributing user.

17. The system of claim 16, wherein the action relating to the particular user includes one or more of identifying the particular contributing user as a provider of high-value information, rewarding the particular contributing user, soliciting further contributions from the particular contributing user, soliciting further contributions from the particular contributing user relating to a particular topic or category of information, restricting contributions from the particular contributing user, or banning contributions from the particular contributing user.

18. The system of claim 13, wherein the one or more computing devices are further configured to derive the fact value function using the ListMLE listwise technique to generate the second ranking by generating a succession of intermediate rankings of the first knowledge base facts and minimizing a loss function representing differences between the first ranking and each of the intermediate rankings.

19. The system of claim 13, wherein the one or more computing devices are further configured to:
- generate a plurality of third knowledge base facts for inclusion in the knowledge base;
- determine an aggregate value for the third knowledge base facts using the fact value function; and
- use the aggregate value to generate a first score for a knowledge acquisition technique by which the third knowledge base facts were generated, or a second score for an information source from which the third knowledge base facts were derived.

20. The system of claim 13, wherein the one or more computing devices are further configured to:
- extract a plurality of facts from one or more information sources;
- generate a fact value for each of the facts using the fact value function and a corresponding set of features;
- aggregate the fact values;
- take an action based on the aggregated fact values.

21. The system of claim 20, wherein the one or more computing devices are further configured to take the action based on the aggregated fact values by:
- targeting a first information source or a category of information for knowledge acquisition;

selecting one of a plurality of knowledge acquisition techniques for knowledge acquisition;

configuring a first knowledge acquisition technique for knowledge acquisition; or rating a second information source in connection with knowledge acquisition.

22. The system of claim 13, wherein a specific first knowledge base fact includes a first relation object, and wherein the set of features for the specific first knowledge base fact includes a corresponding feature for each combination in the knowledge base of the first relation object and an entity object representing a particular attribute.

23. The system of claim 13, wherein a specific first knowledge base fact includes a first relation object, and wherein the set of features for the specific first knowledge base fact includes a corresponding feature for each combination in the knowledge base of the first relation object and an entity object representing a particular class of entities.

\* \* \* \* \*